(12) United States Patent
Gersten et al.

(10) Patent No.: US 11,791,699 B2
(45) Date of Patent: Oct. 17, 2023

(54) ROTOR ARRANGEMENT

(71) Applicant: ZF Friedrichshafen AG, Friedrichshafen (DE)

(72) Inventors: Rayk Gersten, Friedrichshafen (DE); Stefan Spühler, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/552,945

(22) Filed: Dec. 16, 2021

(65) Prior Publication Data
US 2022/0200420 A1 Jun. 23, 2022

(30) Foreign Application Priority Data
Dec. 18, 2020 (DE) ............. 10 2020 216 242.5

(51) Int. Cl.
*H02K 15/03* (2006.01)
*H02K 1/28* (2006.01)
*H02K 1/276* (2022.01)

(52) U.S. Cl.
CPC ........... *H02K 15/03* (2013.01); *H02K 1/2766* (2013.01); *H02K 1/28* (2013.01); *Y10T 29/5313* (2015.01)

(58) Field of Classification Search
CPC .. H02K 15/02; H02K 1/2766; H02K 15/0012; H02K 3/527; H02K 1/32; H02K 1/20; H02K 15/03; Y10T 29/49009; Y10T 29/49826; Y10T 29/49078; Y10T 29/49012; Y10T 29/5313

USPC ............. 29/729, 596, 598, 732, 738
See application file for complete search history.

(56) References Cited

U.S. PATENT DOCUMENTS 6,020,661 A * 2/2000 Trago ............... H02K 15/16
310/43

FOREIGN PATENT DOCUMENTS

DE 102011053632 A1 * 12/2012 ......... H02K 17/205
DE 10 2015 203 018 A1 8/2016
DE 10 2017 011 989 A1 6/2018

* cited by examiner

*Primary Examiner* — Thiem D Phan
(74) *Attorney, Agent, or Firm* — Finch & Maloney PLLC

(57) ABSTRACT

A rotor arrangement (1a, 1b) for an electric machine of a vehicle. The rotor arrangement (1a, 1b) comprises a rotor lamination stack (4) and the rotor arrangement further comprises a rotor support (2a, 2b). The rotor support (2a, 2b) carries the rotor lamination stack (4), which is arranged on the radially outer side (6a, 6b) of the rotor support (2a, 2b). A retaining element is arranged on the outer side (6a, 6b) of the rotor support at the end on the rotor lamination stack (4). The retaining element is a one-piece, closed retaining ring (5a, 5b) with an axial ring width (SR) and with at least a first ring diameter (R1). The first ring diameter (R1) is smaller than or equal to the rotor support diameter (TR), so that the rotor laminate stack (4) is secured axially in a rotationally fixed manner. The invention also relates to two production methods.

16 Claims, 3 Drawing Sheets

ROTOR ARRANGEMENT

This application claims priority from German Patent Application Serial No. 10 2020 216 242.5 filed on Dec. 18, 2020.

FIELD OF THE INVENTION

The invention relates to a rotor arrangement for an electric machine of a vehicle, wherein the rotor arrangement comprises a rotor lamination stack and wherein the rotor arrangement also comprises a rotor support that extends in the axial direction along a rotational axis, with a radially outer side and with a rotor support diameter such that the rotor support carries the rotor lamination stack, which is arranged radially on the outside of the rotor support, and wherein the rotor arrangement comprises a safety element which is arranged on the outside of the rotor support. Furthermore, the invention relates to two production methods.

BACKGROUND OF THE INVENTION

Electric machines are generally known. They comprise a rotor rotating around a shaft and a stator which is positionally fixed relative to the rotor. The electric machine can be for example, a motor, a generator or a motor-generator. Furthermore, such a machine comprises a stator and rotor lamination stack.

The stator and rotor lamination stack has, in each case, a marked influence on the electrical, magnetic and mechanical properties of the electric motor. The lamination stack of a rotor, which carries a magnetic flux in order to produce torque can be, for example, connected directly on the rotor shaft or be connected to the shaft of the electric machine by way of a rotor support, as is the case for example in external-rotor machines.

Lamination stacks for an electric motor are usually made from metal sheets. The individual laminae are usually produced from sheet metal by stamping and then, for example, stacked one after another on orientation rods as an aid to assembly, packed, and finally fastened together for example by forming weld seams parallel to the rotor axis at their circumference. They then form a complete lamination stack, which has to be installed on the rotor support.

Furthermore, it is known to cool the stator lamination stack and the rotor lamination stack by means of injected oil.

DE 10 2017 011 989 A1 discloses a rotor for an electric machine, which comprises two lamination stacks that consist of a plurality of rotor segment sub-stacks which are mounted on a rotor shaft, wherein the lamination stacks are axially fixed on both sides by means of a securing element in each case, wherein the securing element is in the form of an overlapping retaining ring, and wherein the overlap takes place by virtue of a stop disk comprising inner teeth.

SUMMARY OF THE INVENTION

A purpose of the present invention is to achieve a rotor arrangement with a precise and rotationally fixed arrangement of the rotor lamination stack and a production method with simplified assembly, which ensures precise securing of the rotor lamination stack.

This objective is achieved by a rotor arrangement having the features specified in the claims below, and a first and second production method and/or assembly method having the features of the claims below.

Further details of the invention and advantages of various embodiments emerge from the features described in the subordinate claims.

The objective is achieved by a rotor arrangement for an electric machine of a vehicle, wherein the rotor arrangement comprises a rotor lamination stack and wherein the rotor arrangement also comprises a rotor support that extends in an axial direction along a rotational axis, the rotor support having a radial outer side and a rotor support diameter such that the rotor support carries the rotor lamination stack, which is arranged radially on the outside of the rotor support, and wherein the rotor arrangement further comprises a securing element which is arranged on the outside of the rotor support at an end on the rotor lamination stack, wherein the securing element is in the form of a one-piece, closed, rotationally symmetrical retaining ring with an axial ring width and with at least a first ring diameter such that the said first ring diameter is smaller than or equal to the diameter of the rotor support, so that rotationally fixed axial securing of the rotor lamination stack is achieved.

According to the invention it has been recognized that conventional retaining rings cannot be used owing to high circumferential speeds.

The rotor arrangement, according to the invention, includes a closed retaining ring that forms a rotation speed resistant cylindrical centering seat with its first ring diameter, and which is directly and firmly in contact with the rotor support, wherein the first ring diameter almost corresponds in the assembled condition to the diameter of the rotor support. In that way, the rotor lamination stack is held firmly in its position by the retaining ring at the ends.

At opposite ends the rotor support can, for example, delimit the rotor lamination stack.

A rotor support is usually arranged rotatably on a shaft.

Due to the structure of the retaining ring as a closed retaining ring with a first ring diameter which is equal to or smaller than that diameter of the rotor support itself, a secure (resistant to slipping and rotation) arrangement is possible, which ensures firm and stable axial securing of the rotor lamination stack. Moreover, owing to the configuration as a closed retaining ring, it cannot be disassembled non-destructively.

Preferably, the first ring diameter is smaller than the rotor diameter. In that way, an even firmer seating of the retaining ring on the rotor support is ensured.

Also preferably, the rotor support has an all-round groove in which the retaining ring is engaged or arranged. Thus, even under high load the retaining ring can block any axial displacement. Thereby a rear-hook configuration is realized.

In a further preferred design, the retaining ring has a plurality of radially inward-facing projections, not diametrically opposite one another, which extend over part of the axial ring width, whereby a second ring diameter is formed. Thus, the second ring diameter is smaller than the first ring diameter. This means that the said projections are arranged over part of the retaining ring and are not arranged over the complete axial ring width. Moreover, the projections are only arranged offset relative to one another so that they are not diametrically opposite one another.

In particular, the projections are arranged on the side of the retaining ring that faces away from the rotor lamination stack. In that way, the retaining ring, with that side which has the first ring diameter and which faces toward the rotor lamination stack, forms the rotation-speed-resistant centering seat. Preferably, the projections are arranged on the side of the retaining ring that faces away from the rotor lamination stack.

Preferably, the projections are engaged or arranged in the all-round groove. The side of the retaining ring facing toward the rotor lamination stack, with the first ring diameter, thus forms the centering seat, i.e., the axial rotation prevention and centering feature, and the projections, which form the rear-hook engagement in the groove, protect the retaining ring additionally against axial displacement.

Preferably, by virtue of the all-round groove the rotor support has a groove-base diameter in the all-round groove, this groove-base diameter being smaller than the second ring diameter. This means that the projections are not in contact with the all-round groove base.

In a further preferred design, the rotor support has axially longitudinal grooves that extend as far as the all-round groove, so that by virtue of the projections position-related fitting of the retaining ring is made possible.

Also preferably, the number of projections and the number of axial longitudinal grooves are the same, i.e., identical. Thanks to these axial longitudinal grooves, position-related assembly can be achieved in a simple manner.

Preferably, the retaining ring has axial retaining grooves (longitudinal grooves along the retaining ring). Through these, oil, which is used for cooling and/or lubricating the rotor or rotor lamination stack, can emerge simply. Preferably the longitudinal grooves of the retaining ring are arranged over the projections, i.e., above them in the radial direction. Thus, the longitudinal retaining ring grooves and the axial longitudinal grooves of the rotor support form a line through which the oil can flow.

In addition, the stated objective is achieved by a first method, in particular for producing and/or assembling, a rotor arrangement as described above, wherein the rotor arrangement comprises a rotor support that extends in an axial direction along a rotational axis, the said rotor support having a radially outer side on which is arranged a rotor lamination stack, and with a rotor support diameter, wherein the rotor support also has an all-round groove and a plurality of longitudinal grooves that extend axially as far as the said all-round groove, the said method comprising the following steps:

A retaining ring is produced, such that the retaining ring has a first diameter and comprises radially inward-facing projections, which are not diametrically opposite one another, over a partial area of an axial ring width, by virtue of which a second ring diameter is formed, such that the first ring diameter is larger than the second ring diameter, and wherein the number of longitudinal axial grooves is the same as or larger than the number of the said projections, and wherein the first ring diameter is smaller than or equal to the rotor support diameter,
  The retaining ring is heated so that it expands,
  The projections are positioned in the longitudinal axial grooves and the heated retaining ring is pushed along in such a manner that the projections are pushed along in the longitudinal axial grooves until the projections are hooked into the all-round groove, and the retaining ring, with its first ring diameter, is arranged at the end on the rotor lamination stack,
  The heated retaining ring is cooled down.

Due to the heating, the retaining ring expands until despite having a first ring diameter smaller than the diameter of the rotor support it can be pushed onto the rotor support. By virtue of the longitudinal axial grooves and the projections, position-related assembly is possible. Thus, due to the heating, assembly is possible without the use of force. In the above, "on the rotor lamination stack" means that the retaining ring is arranged facing toward the rotor lamination stack.

Alternatively, the retaining ring can be pressed on under the action of force.

The rotor support can also have a plurality of outward-facing radial appendages, which are arranged uniformly on the end a distance apart, with the retaining ring arranged between the rotor lamination stack and the said appendages so as to ensure an axial, rotationally fixed securing of the rotor lamination stack. Preferably, the plurality of outward-facing radial appendages form an all-round outward-facing radial appendage. In this design of the rotor arrangement there is no need to form longitudinal grooves in the rotor support and to form an all-round groove. Thanks to the design of the first and in this case only ring diameter as smaller than or equal to the diameter of the rotor support, a centering seat is formed. The appendage(s) form a rear-hook structure so that no axial displacement of the retaining ring is possible.

Preferably, the retaining ring has axial longitudinal retaining ring grooves for the passage, for example, of oil.

Furthermore, the objective is achieved by a second method of production and/or assembly, in particular of a rotor arrangement as described above, wherein the rotor arrangement comprises a rotor support that extends in an axial direction along a rotational axis, which rotor support has a radial outside on which a rotor lamination stack is arranged, and has a rotor support diameter, wherein the outside of the rotor support has an appendage that faces radially outward, which is arranged at the end a distance away from the rotor lamination stack, the said method comprising the following steps:

Production of a retaining ring, such that the retaining ring has a first ring diameter, and wherein the said first ring diameter is smaller than or equal to the diameter of the rotor support,
  Heating of the retaining ring in order to expand it,
  Pushing the heated retaining ring along the rotor support and pushing it over the appendage until the retaining ring is positioned between the rotor lamination stack and the appendage,
  Cooling the heated retaining ring in order to secure the rotor lamination stack axially in a rotationally fixed manner.

In that way, simple assembly without the use of force is made possible. Thus, the retaining ring cannot be removed non-destructively.

BRIEF DESCRIPTION OF THE DRAWINGS

Further features, properties and advantages of the present invention emerge from the description that follows, with reference to the attached figures. Variations thereof can be derived by those with knowledge of the subject without departing from the protective scope of the invention as defined by the claims that follow.

The figures show, in each case schematically.

DETAILED DESCRIPTION OF THE PREFERRED EMBODIMENTS

Figure 1:
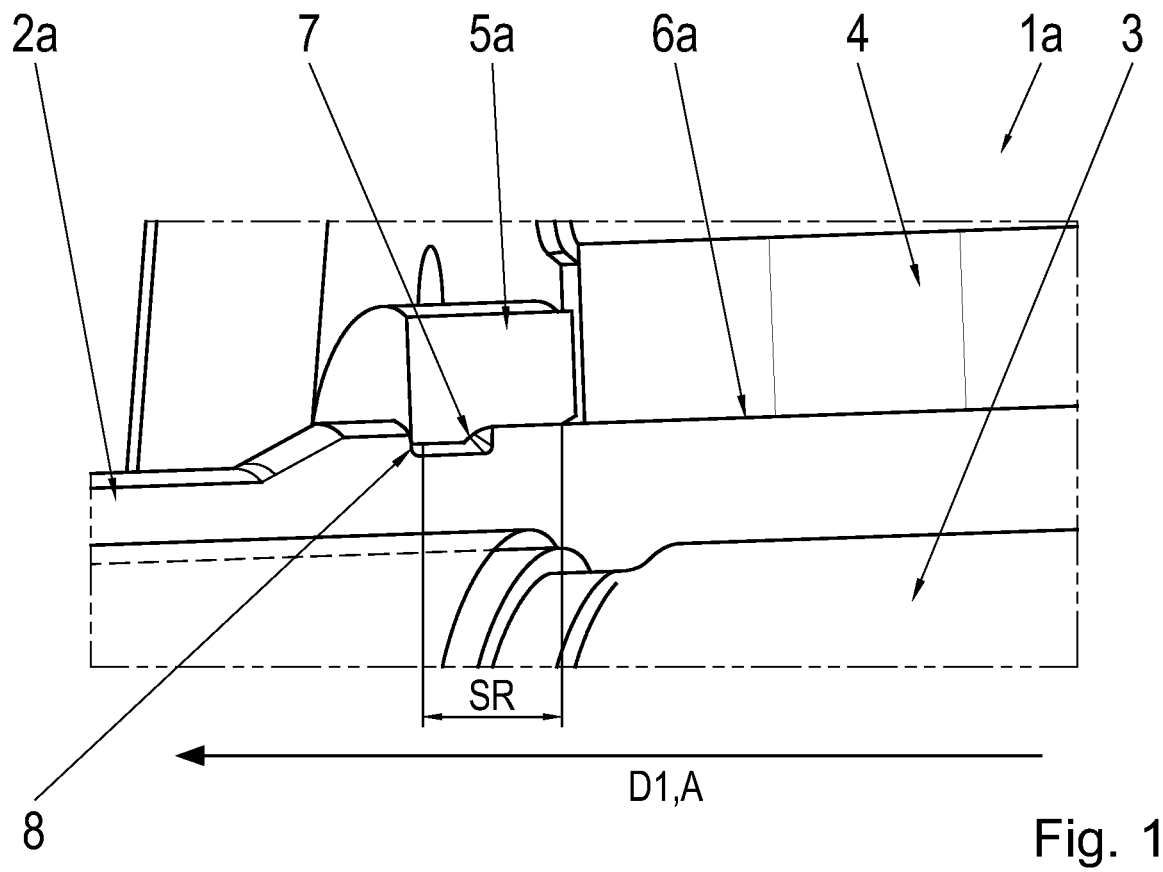
FIG. 1: A first embodiment of a rotor arrangement according to the invention, shown schematically.

FIG. 1 shows a first embodiment of a rotor arrangement 1a according to the invention, represented schematically.

This comprises a rotor support 2a which is arranged, for example, on a shaft 3.

The shaft 3 and the rotor support 2a have a rotational axis D1, which at the same time defines the axial direction A.

Furthermore, the rotor arrangement 1a comprises a rotor lamination stack 4, and the rotor lamination stack 4 is supported by the rotor support 2a on the radially outer surface 6a of the rotor support 2a. A rotor lamination stack of this type usually consists of a plurality of stamped-out sheet-metal lamellae, which are arranged on the said outer surface 6a of the rotor support 2a. The rotor support 2a has a rotor support diameter TR.

In this, the rotor lamination stack 4 and the rotor support 2a are usually parts of a rotor which also has windings (not shown), which can be arranged along the rotor lamination stack 4.

Such a rotor (not shown) is part of an electric machine, which also comprises a stator (not shown). The shaft 3, onto which the rotor is fixed, ensures that the rotor and thus also the rotor support 2a and the rotor lamination stack 4 can rotate along the stator. For that purpose the rotor lamination stack 4 has to be fixed onto the rotor support 2a in a rotationally fixed manner.

The rotor arrangement 1a also comprises a retaining ring 5a, which is arranged at the end on the outside 6a on the rotor lamination stack 4 of the rotor support 2a.

In this case, the retaining ring 5a is in the form of a closed, rotationally symmetrical retaining ring 5a. The retaining ring 5a has an axial ring width SR. The retaining ring 5a forms a first ring diameter R1. In this case, the first ring diameter R1 of the retaining ring 5a is smaller than the rotor support diameter TR. In this way, a centering seat is formed, which corresponds to the rotor support diameter TR. Thus, the rotor lamination stack 4 is axially secured.

Furthermore, the retaining ring 5a has projections 8 which are directed radially inward.

Figure 2:
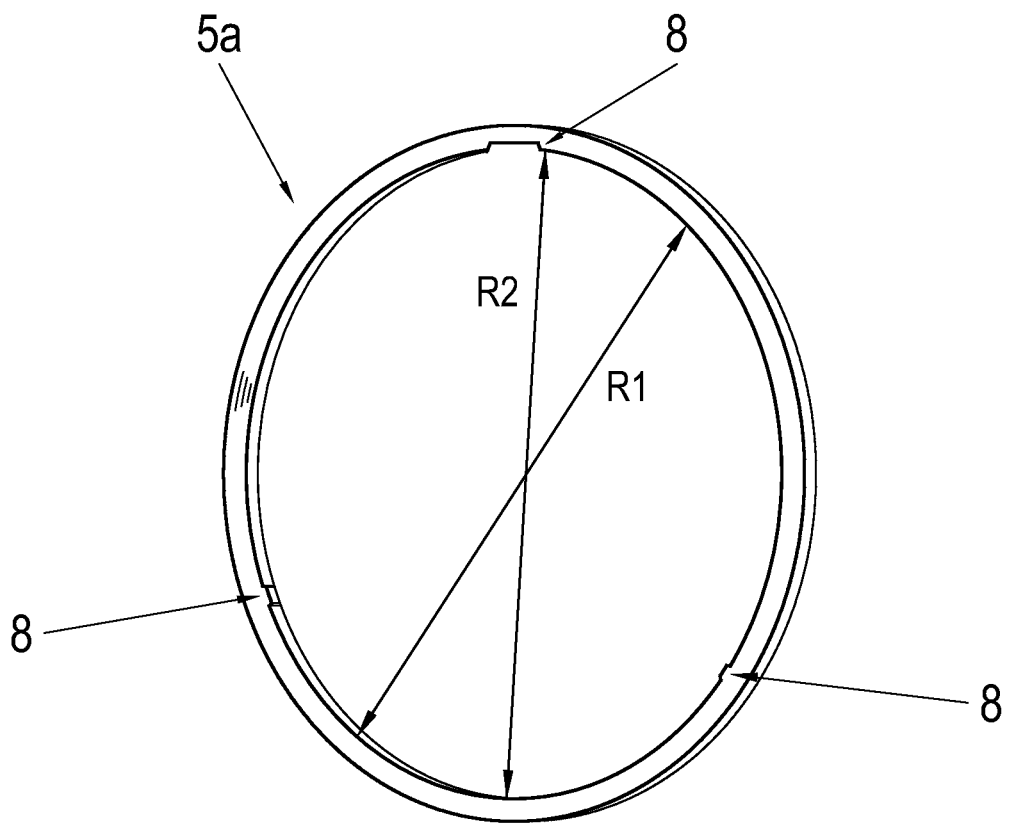
FIG. 2: A retaining ring, shown schematically.

FIG. 2 shows a retaining ring 5a of that type in detail. The said projections 8 extend only over a partial region of the axial ring width SR (FIG. 1), and this, over a partial region facing away from the rotor lamination stack 4. The projections 8 are arranged facing inward and, in each case, are not diametrically opposite one another. In that way, over the said partial region a second ring diameter R2 is formed. This second ring diameter R2 is smaller than the first ring diameter R1.

As can also be seen in FIG. 1, the rotor support 2a has an all-round groove 7 which is arranged in such a manner that the projections 8 are positioned in this all-round groove 7. At the location of the all-round groove 7 the rotor support 2a has a groove base diameter which is smaller than the second ring diameter R2. Thus, the retaining ring 5a is not in contact with the groove base.

Figure 3:
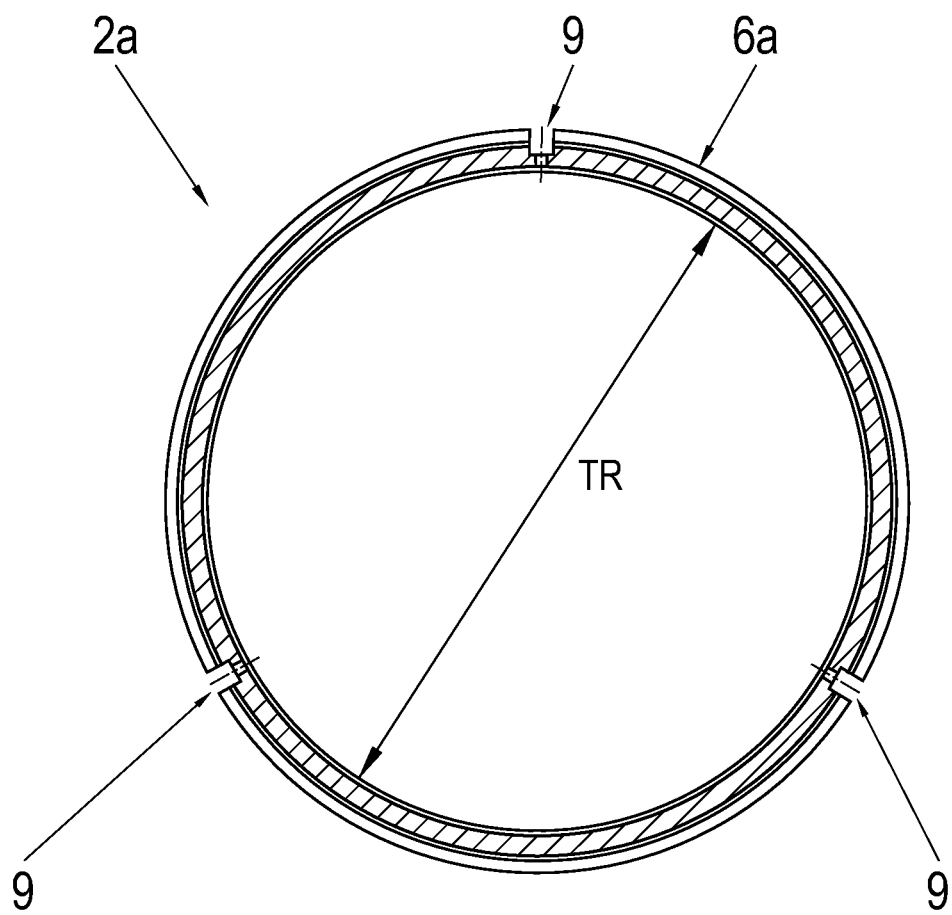
FIG. 3: A rotor support with longitudinal axial grooves, in detail.

If an axial displacement takes place, then owing to its projections 8 the retaining ring 5a hooks into the groove 7 and is axially secured. In addition, the outer surface 6a of the rotor support 2a has axial longitudinal grooves 9 (FIG. 3). These extend at least on one side of the rotor support 2a as far as the groove 7. The number of axial longitudinal grooves 9 (FIG. 3) corresponds to the number of projections 8.

The retaining ring 5a is first heated to fit the retaining ring 5a. It expands due to the heating. For example, for that purpose the retaining ring 5a is made from case-hardening steel 16MnCr5 which, on the one hand, has high wear resistance and, on the other hand, expands substantially. For the fitting, the projections 8 of the heated and expanded retaining ring 5a are positioned in the axial longitudinal grooves 9 (FIG. 3) and slid along them until they engage in the all-round groove 7 or are positioned therein.

Thanks to the structure of the axial longitudinal grooves 9 (FIG. 3), position-related assembly is possible. Thereafter, the retaining ring 5a is cooled, for example due to the ambient temperature.

FIG. 3 shows the axial longitudinal grooves 9 of the rotor support 2a in detail.

In addition, the retaining ring 5a has axial longitudinal retaining ring grooves 10, i.e., longitudinal grooves along the retaining ring 5a.

Figure 4:
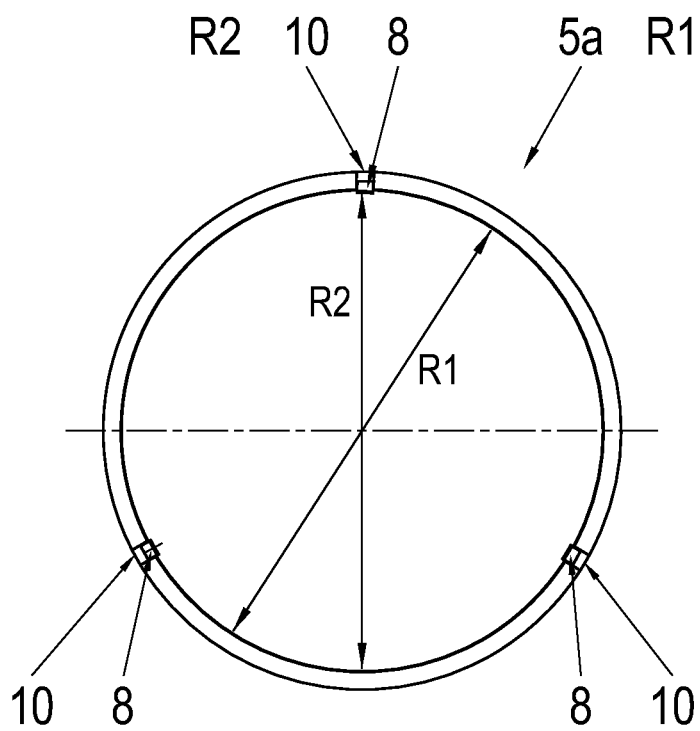
FIG. 4: A retaining ring with longitudinal retaining ring grooves.

These retaining ring longitudinal grooves 10 are shown in more detail in FIG. 4. Through them oil, which is used for the cooling and/or lubrication of the rotor and rotor lamination stack 4, can make its way in easily.

In this case, the retaining ring longitudinal grooves 10 are arranged over the projections 8, i.e., above them in the radial direction. Thus, the retaining ring longitudinal grooves 10 and the axial longitudinal grooves 9 (FIG. 3) of the rotor support 2a form a line through which the oil can emerge.

By virtue of such a closed retaining ring 5a with a cylindrical centering seat, which has a ring diameter R1 (FIG. 2) which is smaller than the rotor support diameter TR (FIG. 3), and also the rear-hook configuration, the rotor lamination stack 4 can be axially secured in a manner unaffected by rotation speed.

Dismantling is not possible without destroying the retaining ring 5a according to the invention.

Figure 5:
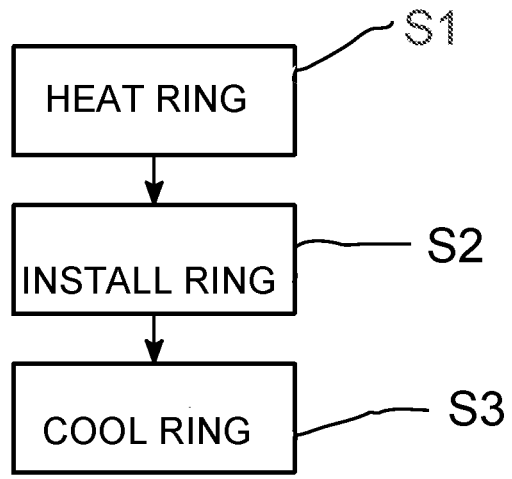
FIG. 5: A method according to the invention for fitting the retaining ring, shown schematically.

FIG. 5 illustrates the method, according to the invention, for fitting the retaining ring 5a (FIG. 1).

For this, in a first step S1 the retaining ring 5a (FIG. 1) is heated to expand it.

In a second step S2, the retaining ring 5a (FIG. 1) is now positioned with the projections 8 (FIG. 1) in the axial longitudinal grooves 9, and pushed along the rotor support (2a) (FIG. 1). Owing to the expansion, the retaining ring 5a can now be fitted onto the rotor support 2a (FIG. 1) despite originally having a smaller ring diameter R2 (FIG. 2). The retaining ring 5a is pushed along the axial longitudinal grooves 9 (FIG. 3) of the rotor support 2a (FIG. 1) until the projections 8 (FIG. 1) have hooked into the all-round groove 7 (FIG. 1) and the retaining ring 5a (FIG. 1) with its first ring diameter R1 (FIG. 2) is arranged at the end on the rotor lamination stack 4 (FIG. 1).

In a third step S3, the heated retaining ring 5a (FIG. 1) is cooled. In that way, the retaining ring 5a (FIG. 1) can be fitted without the use of force.

Figure 6:
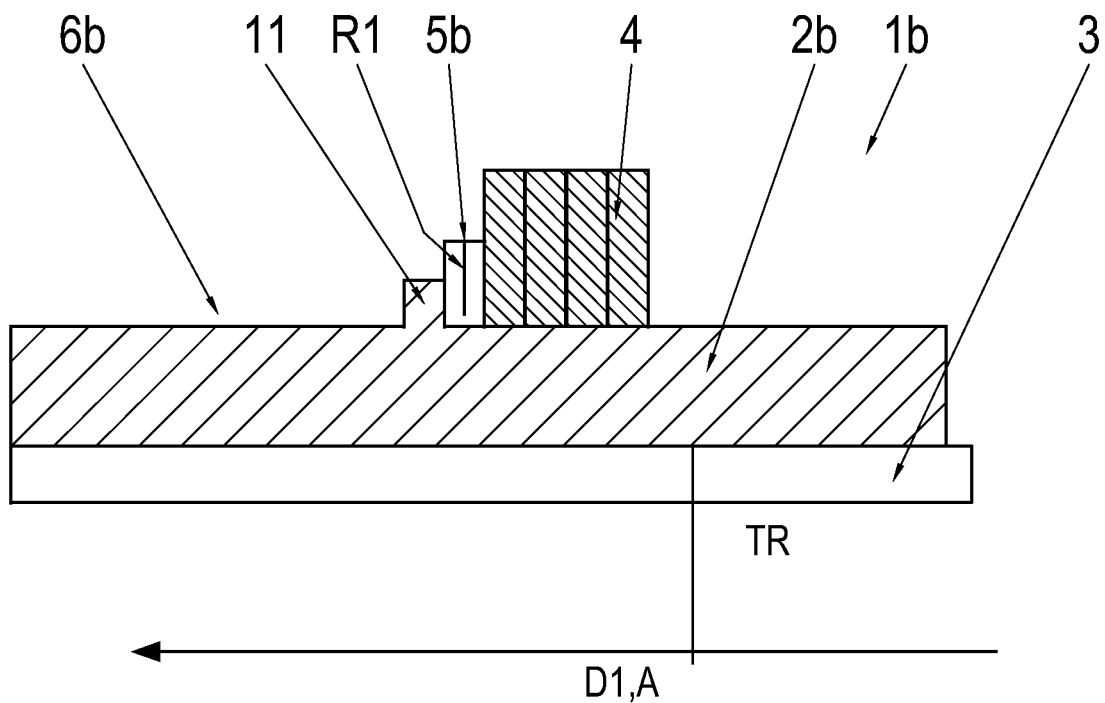
FIG. 6: A second embodiment of a rotor arrangement according to the invention, shown schematically.

FIG. 6 shows a further design of a rotor arrangement 1b with a retaining ring 5b according to the invention.

This rotor arrangement 1b has a rotor support 2b which is arranged, for example, on a shaft 3.

The shaft 3 and also the rotor support 2b have a rotational axis D1 and an axial direction A.

Furthermore, the rotor arrangement 2b comprises the rotor lamination stack 4, wherein the rotor lamination stack 4 is carried by the rotor support 2b on the radially outer surface 6b of the rotor support 2b.

Such a rotor lamination stack 4 usually consists of a plurality of stamped-out sheet-metal laminations, which are arranged on the outer surface 6b of the rotor support 2a. The rotor support 2b has a rotor support diameter TR.

In this case, the rotor lamination stack 4 and the rotor support 2b are usually part of a rotor, which also has windings (not shown) which can be arranged along the rotor lamination stack 4.

Such a rotor (not shown) is part of an electric machine which, in addition, comprises a stator (not shown). The shaft 3 on which the rotor is fixed ensures that the rotor and thus also the rotor support 2b and the rotor lamination stack 4 can rotate along the stator.

For this, the rotor lamination stack 4 must be attached rotationally fixed onto the rotor support 2b.

The rotor arrangement 1b also comprises a retaining ring 5b, which is arranged on the outside 6b of the rotor lamination stack 4 of the rotor support 2.

The retaining ring 5b has a ring diameter R1. This ring diameter R1 is smaller than the diameter TR of the rotor support of the rotor support 2b.

In addition, the rotor support 2b has an all-round appendage 11, which is likewise arranged at the end a distance away from the rotor lamination stack 4. The said appendage is arranged radially, directed outward.

The retaining ring 5b is arranged between the rotor lamination stack 4 and the appendage 11, in a rear-hook formation. By virtue of the smaller ring diameter R1 compared with the rotor support diameter TR, a cylindrical centering seat is formed.

In that way, the appendage 11 creates a rear hooking configuration which prevents the axial displacement of the retaining ring 5b.

Furthermore, the retaining ring 5b has axial longitudinal retaining ring grooves (not shown), i.e., longitudinal grooves along the retaining ring 5b. Through these, the oil used to cool and/or lubricate the rotor and rotor lamination stack 4 can pass through easily.

For assembly, the retaining ring 5b is heated in order to expand it.

Thereafter, the heated retaining ring 5b is fitted onto the rotor support 2b and slid along it. Owing to the heating, the retaining ring 5b now has a larger diameter than the diameter TR of the rotor support. The retaining ring 5b is pushed over the radially outward-directed appendage 11 so that the retaining ring 5b is positioned at the end between the rotor lamination stack 4 and the appendage 11. After cooling, the retaining ring 5b rests against the rotor support 2b in a manner unaffected by rotation speed, to secure the rotor lamination stack 4 in an axially and rotationally fixed manner. This enables fitting of the retaining ring 5b without the use of force.

INDEXES 1a, 1b Rotor arrangement
2a, 2b Rotor support
3 Shaft
4 Rotor lamination stack
5a, 5b Retaining ring
6 Outer surface
7 Groove
8 Projection
9 Axial longitudinal groove
10 Longitudinal retaining ring grooves
11 Appendage
TR Rotor support diameter
R1 First ring diameter
R2 Second ring diameter
D1 Rotational axis
A Axial direction

The invention claimed is:

1. A rotor arrangement for an electric machine of a vehicle, wherein the rotor arrangement comprises a rotor lamination stack, and
the rotor arrangement further comprises a rotor support that extends in an axial direction along a rotational axis, the rotor support has a radially outer surface with a rotor support diameter,
the rotor support carries the rotor lamination stack, the rotor lamination stack is arranged on the radially outer surface of the rotor support, a retaining element is mounted on the radially outer surface of the rotor support at an axial end of the rotor lamination stack,
the retaining element is in the form of a one-piece, closed, rotationally symmetrical retaining ring and has an axial ring width and a radially inner surface having at least a first ring diameter, and
the first ring diameter is smaller than or equal to the rotor support diameter such that the radially inner surface of the retaining ring directly mates with the radially outer surface of the rotor support and so that the rotor lamination stack (4) is secured axially in a rotationally fixed manner.

2. The rotor arrangement according to claim 1, wherein the first ring diameter is smaller than the rotor support diameter.

3. The rotor arrangement according to claim 1, wherein the rotor support has an all-round groove in which the retaining ring is hooked/arranged.

4. The rotor arrangement according to claim 3, wherein the retaining ring has a plurality of radially inward-directed projections that are diametrically offset from one another, which extend over a partial region of the axial ring width, whereby a second ring diameter is formed.

5. The rotor arrangement according to claim 4, wherein the projections are arranged on a side of the retaining ring that faces away from the rotor lamination stack.

6. The rotor arrangement according to claim 4, wherein the projections are hooked/arranged in the all-round groove.

7. The rotor arrangement according to claim 4, wherein by virtue of the all-round groove, the rotor support forms a groove base diameter at the all-round groove , and the groove base diameter is smaller than the second ring diameter.

8. The rotor arrangement according to claim 3, wherein the rotor support has axial longitudinal grooves that extend to the all-round groove, so that by virtue of the projections position-related fitting of the retaining ring is enabled.

9. The rotor arrangement according to claim 8, wherein a number of projections is equal to a number of axial longitudinal grooves in the rotor support.

10. The rotor arrangement according to claim 3, wherein the retaining ring has axial longitudinal retaining ring grooves.

11. The rotor arrangement according to claim 1, wherein the rotor support has a plurality of outward-directed radial appendages, which are arranged uniformly at the end a distance away from the rotor lamination stack, and the retaining ring is positioned between the rotor lamination stack and the appendages in order to secure the rotor lamination stack axially in a rotationally fixed manner.

12. The rotor arrangement according to claim 11, wherein the plurality of outward-directed radial appendages form an all-round outward-directed ridge.

13. The rotor arrangement according to claim 11, wherein the retaining ring has axial longitudinal retaining ring grooves.

14. The rotor arrangement according to claim 1, wherein the retaining ring has an axial end surface that directly abuts an axial end surface of the rotor lamination stack such that the rotor lamination stack is axially fixed by the retaining ring.

15. The rotor arrangement according to claim 1, wherein the retaining ring has an other axial end surface opposite from the rotor lamination stack, and the other axial end surface of the retaining ring has radially inner edge having a second ring diameter that is smaller than the first ring diameter, and the other axial end surface of the retaining ring axially abuts a further surface of the rotor support.

16. The rotor arrangement according to claim 15, wherein the axial end surface and the other axial end surface of the retaining ring directly, axially abut the rotor lamination stack and the rotor support, respectively, such that the retaining ring is axially fixed relative to the rotor support.

* * * * *